United States Patent
Luenser

[11] Patent Number: 5,853,091
[45] Date of Patent: Dec. 29, 1998

[54] DISPLAY FRAME/INTERLOCKING STORAGE RACK COMPONENT

[76] Inventor: Carl D. Luenser, 12757 Mozart St., Blue Island, Ill. 60406-1920

[21] Appl. No.: 825,906

[22] Filed: Apr. 2, 1997

[51] Int. Cl.$^6$ .............................. A47F 7/00; B66C 23/42
[52] U.S. Cl. ....................... 211/40; 211/41.12; 211/194; 211/183
[58] Field of Search ................................ 211/40, 41.12, 211/183, 194

[56] References Cited

U.S. PATENT DOCUMENTS

| | | | |
|---|---|---|---|
| 3,650,382 | 3/1972 | Braun et al. | 206/45.14 |
| 3,655,065 | 4/1972 | Yellin | 211/177 |
| 3,907,116 | 9/1975 | Wolf et al. | 211/40 |
| 4,165,572 | 8/1979 | Sussman | 40/10 D |
| 4,594,802 | 6/1986 | Field | 40/10 D |
| 5,038,927 | 8/1991 | Bell | 206/45.14 |
| 5,048,702 | 9/1991 | Maloney | 211/194 |
| 5,191,983 | 3/1993 | Hardy | 211/40 |
| 5,253,751 | 10/1993 | Wipper | 206/45.19 |
| 5,285,907 | 2/1994 | Franchere et al. | 211/74 |
| 5,289,918 | 3/1994 | Dobias et al. | 206/312 |
| 5,289,925 | 3/1994 | Newmark | 211/40 |
| 5,295,577 | 3/1994 | Minter | 206/309 |
| 5,331,756 | 7/1994 | Rehrig | 40/308 |
| 5,442,873 | 8/1995 | Vogler | 40/649 |
| 5,685,439 | 11/1997 | Luenser | 211/194 X |

*Primary Examiner*—Robert W. Gibson , Jr.
*Attorney, Agent, or Firm*—Richard L. Miller, P.E.

[57] ABSTRACT

A display frame/interlocking storage rack component adaptable to receive and display a box and being stackable. The component includes a top with a throughopening for viewing a decorative top of the box. A back wall extends downwardly from the top. A pair of side walls extend downwardly from the top and form with the top an open front for insertion and removal of the box and for viewing a decorative front of the box. A back guide rail extends downwardly from the throughopening in the top and terminates below the back wall in a back guide rail supporting platform that supports the box. The top further includes a back notch for receiving the back guide rail supporting platform of a next stacked display frame/interlocking storage rack component. A pair of side guide rails extend downwardly from the throughopening in the top and terminate below the pair of side walls in a pair of side guide rail supporting platforms that further support the box. The top further includes two pair of side notches that open continuously into both the throughopening in the top and the pair of guide rails. The two pair of side notches are disposed in vertical alignment with the pairs of side guide rail supporting platforms. The two pair of side notches receive the pairs of side guide rail supporting platforms of the next stacked display frame/interlocking storage rack component. A pair of overhangs extend inwardly into the throughopening in the top and fill in the space between the side guide rail supporting platforms of the next stacked display frame/interlocking storage rack component and further support the box positioned in the next stacked display frame/interlocking storage rack component.

21 Claims, 2 Drawing Sheets

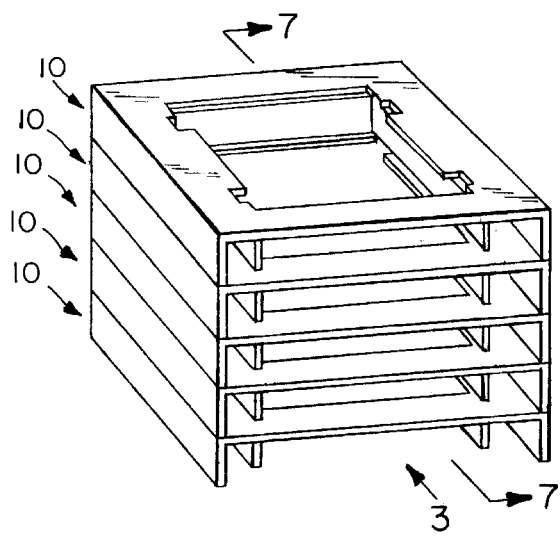
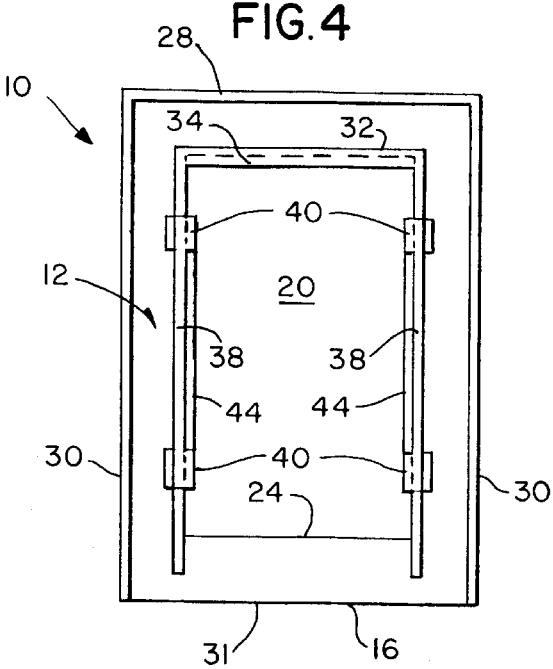
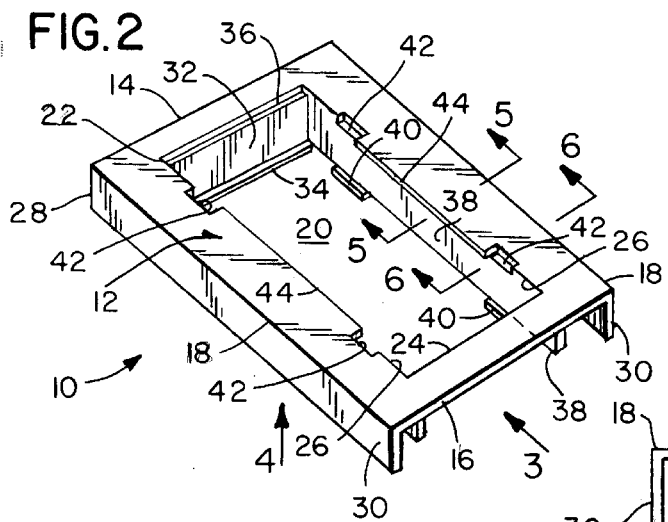
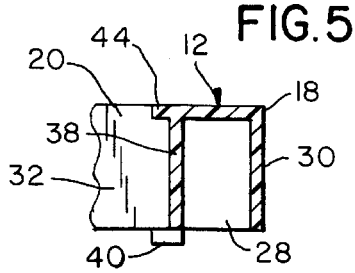
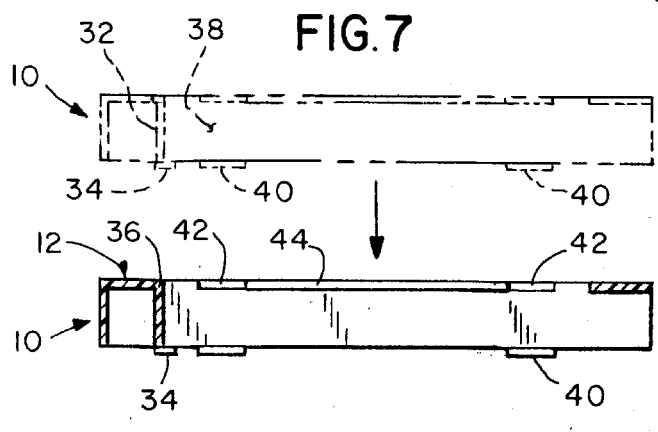
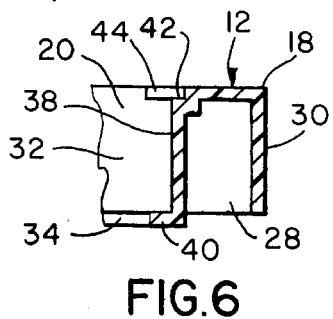

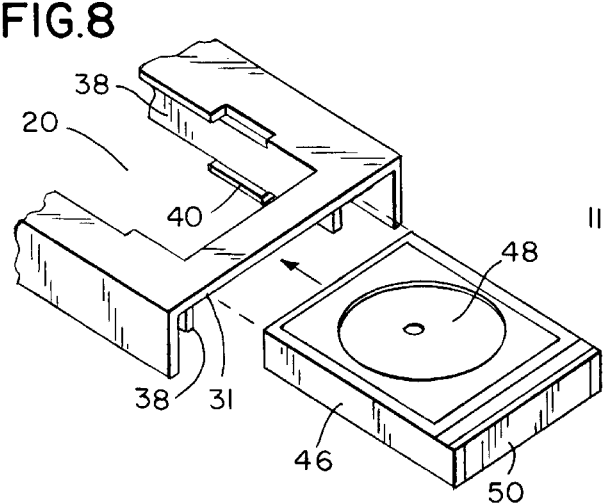
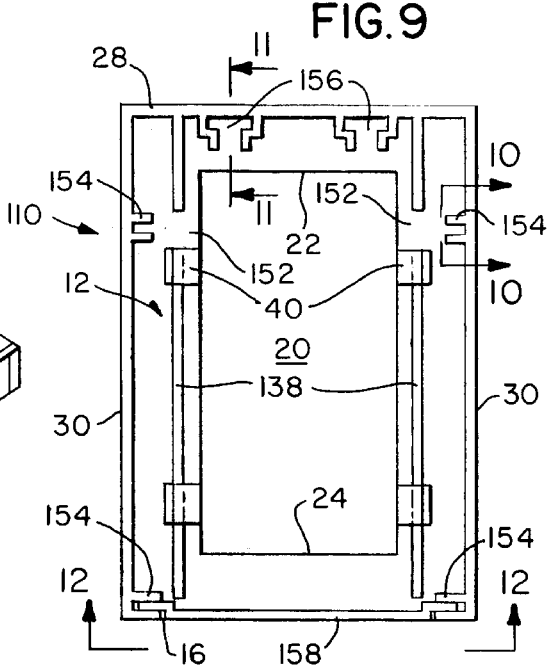
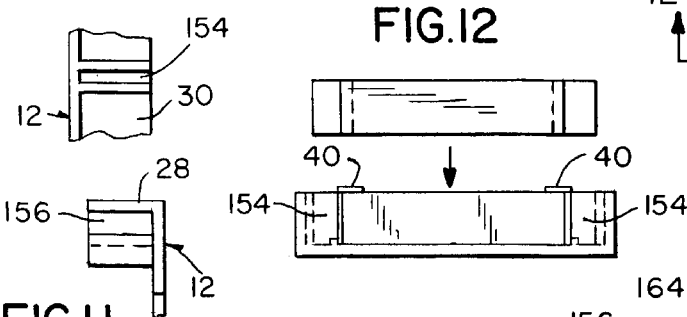
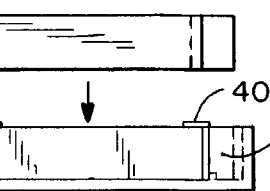
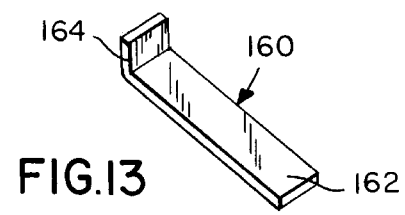
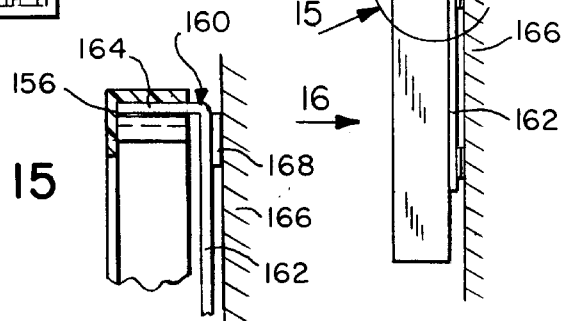
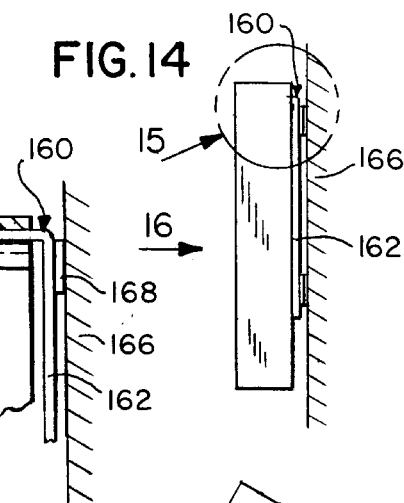
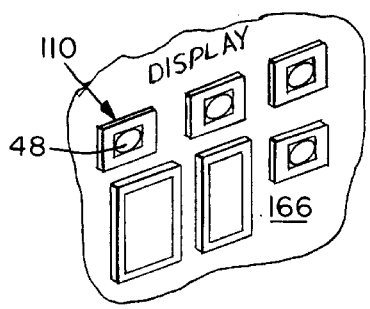
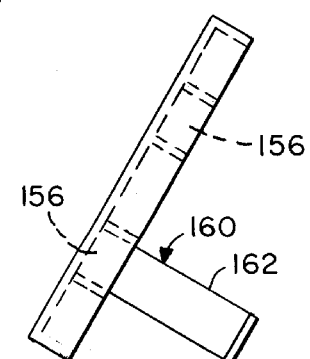
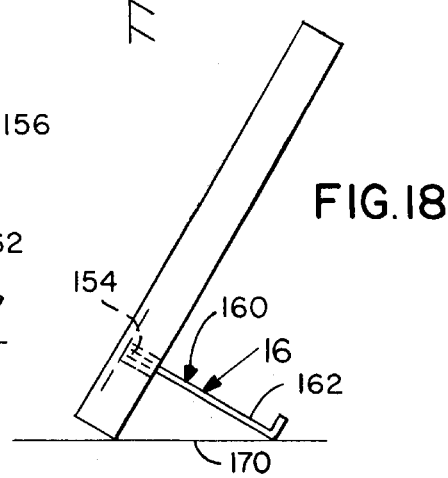

DISPLAY FRAME/INTERLOCKING STORAGE RACK COMPONENT

BACKGROUND OF THE INVENTION

The present invention relates to a storage rack component. More particularly, the present invention relates to a storage rack component that is interlockable and displays at least two surfaces of each of the objects it contains.

People like to decorate their personal spaces with items they find appealing. Movie posters and pictures of recording and film stars often find their place on the walls of fans. The package which contains the pre-recorded music or video has been artfully and carefully designed to be appealing to the consumer. The art work identifies the product and the package contents. There are approximately 500 million compact discs sold annually in the domestic market with a slightly lesser number of pre-recorded audio cassettes and a large number of pre-recorded video cassettes. The public has come to appreciate and collect this pre-recorded entertainment and has developed an outstanding inventory. The collectors of pre-recorded music and videos can listen to the artist on their stereo or view a movie on their television but have no way to make use of the package art work for decoration purposes.

Numerous innovations for storage rack components have been provided in the prior art that will be described. Even though these innovations may be suitable for the specific individual purposes to which they address, however, they differ from the present invention in that they do not provide a storage rack component that is interlockable, stores each of the objects it contains in a recessed portion, and displays at least two surfaces of each of the objects it contains.

FOR EXAMPLE, U.S. Pat. No. 3,650,382 to Braun et al. teaches an improved molded plastic display package. The package includes a first elongated member having an I-beam type cross section and a second U-shaped member that is slidable onto and off of the first member and which includes releasable latch means for engagement with a portion of the first member. Terminal means are provided for mounting and displaying an article of jewelry, for example, with the aid of an elastic extension. The present invention requires a relatively shallow mold.

ANOTHER EXAMPLE, U.S. Pat. No. 3,655,065 to Yellin teaches a knockdown cube member formed of a plastic material. The member includes a top member and a bottom member each integrally formed and being of identical construction and a pair of side members being of identical construction, so that the top, bottom and side member may be readily assembled to form a cube. The cube may be used either individually or to form a module which is readily connected to other similar cubes.

STILL ANOTHER EXAMPLE, U.S. Pat. No. 3,907,116 to Wolf et al. teaches a holder for both boxed and unboxed magnetic tape cassettes. The holder is formed as a rack with shelves sloping down and rearwardly for supporting the ends of the boxed cassettes. The shelves are cut away to define nesting recesses to hold the smaller unboxed cassettes with the fronts thereof in the same vertical plane as the fronts of the boxed cassettes.

YET ANOTHER EXAMPLE, U.S. Pat. No. 4,165,572 to Sussman teaches a display stand for holding an advertisement or other notice in sheet form in an upright position on a counter or desk. The stand is constituted by a pair of complementary pieces each formed by a transparent panel having a right-angle ledge extending from its lower end so that when the two panels are brought together to sandwich a display sheet therebetween, the ledges which extend in opposite directions then define a base to support the panels in an upright position. Each panel, just above the junction of its lower end and ledge, is provided with interlocking elements in the form of a rectangular slot and a companion tongue which projects in a direction opposite to the ledge direction. When the panels are brought together, the tongue of one fits neatly into the slot of the other. Each tongue has an edge notch therein making it possible to slide one panel relative to the other to a position at which the panels are then coincident with each other and are interlocked.

STILL YET ANOTHER EXAMPLE, U.S. Pat. No. 4,594,802 to Field teaches a display device that uses a generally transparent cardholder member that is detachably mounted to a base member. The cardholder member is formed of a pair of plates maintained in a spaced coplanar orientation by plural pin and hole assemblies. A ledge is provided adjacent the lower edge of each of the plates that is adapted to support a display card thereon while the plural pin and hole assemblies additionally provide an auxiliary support surface adapted to mounted supplemental header cards.

YET STILL ANOTHER EXAMPLE, U.S. Pat. No. 5,038,927 to Bell teaches a display case designed to show small objects which are suitable for card mounting. The case has a transparent conduit with a closed end and an open end. Cards on which jewelry or other merchandise is mounted are inserted into the conduit through the open end. In one preferred embodiment a clip having a slot is employed to hold the cards. In another preferred embodiment a second spaced apart slot is provided for insertion of a second set of cards which doubles the display capacity. Support for the card array is provided in one embodiment by one or more protrusions extend into the tube on which the card array rests. These protrusions extend into the tube and provide maximum distance to the wall of the tube which is less than the width of the card array. The protrusions provide support for the vertical array of cards and can be indentations in the wall of the tube. In another embodiment of the invention a rod passing through the wall of the tube is employed as the support for the vertical array of cards. Lockable caps are preferably employed to hold the rod in position. A hanger is provided which attaches to the closed end of the conduit to allow the display case to be hung eliminating the need for counter space. It is preferred that the hanger is rotatably mounted so that the display case can be rotated.

STILL YET ANOTHER EXAMPLE, U.S. Pat. No. 5,048,702 to Maloney teaches a transportable rack for handling bakery goods such as bread which is made of moldable plastic. The rack has a base trolley on which are mounted modular stackable shelf units having longitudinally extending parallel side rails adapted to hold bakery goods for transport and separating members outboard each shelf unit which provide vertical separation between the shelves and transmit the weight of the shelf and its contents downward so that each shelf is light. The separating members form a vertical load-bearing and bracing column on each side of the rack.

YET STILL ANOTHER EXAMPLE, U.S. Pat. No. 5,191,983 to Hardy teaches a modular storage rack for CD jewel boxes, or the like. The rack comprises individual tray units that are stackable vertically and connectable laterally. The tray itself has no moving parts but only a ribbon spring which acts to both secure the jewel box when inserted and eject the same when retrieval is desired. Release of the jewel box is obtained by inward pressure against the spring and rotation of the box about a fulcrum on one of the tray walls, permitting the spring to urge the box out of the tray.

STILL YET ANOTHER EXAMPLE, U.S. Pat. No. 5,253, 751 to Wipper teaches a package for the retail display of a compact disc that includes a base hingedly connected to the cover of a conventional jewel box, and a tray in which the disc is removably stored by a circular array of flexible fingers. A narrow slot is formed in the elevated portion which extends along its entire length.

YET STILL ANOTHER EXAMPLE, U.S. Pat. No. 5,285, 907 to Franchere et al. teaches racks or tray arrays for use in clinical laboratories, in particular, to support tubes and other containers holding body fluid specimens. The invention allows the user to "build" racks or arrays of larger and/or smaller capacity, depending upon the user's requirements, by rapid snapping together of a plurality of identical modular tube units. The racks or units may have a variety of size openings for accommodating different size specimen containers, and containers of different configuration. Thus, the user can maintain stable support of a great many containers simultaneously for handling in the laboratory, thus avoiding the danger of dropping or spilling specimens. The arrangements of the invention may be comprised of reusable, autoclavable moldable plastic materials, or less expensive throw away moldable materials. The individual components making up the tube rack array may be of a variety of geometric configurations.

STILL YET ANOTHER EXAMPLE, U.S. Pat. No. 5,289, 918 to Dobias et al. teaches an unitary sheet storage container for a compact disc. The container has a disc holder panel that enables the insertion of a compact disc down into the disc holder panel which holds the disc at four points on its outer periphery.

YET STILL ANOTHER EXAMPLE, U.S. Pat. No. 5,289, 925 to Newmark teaches a display for organizing cases of compact discs which allows viewing of a part of only the front face of the package.

STILL YET ANOTHER EXAMPLE, U.S. Pat. No. 5,295, 577 to Minter teaches an upwardly opening tray for storing compact disc packages. Cooperatively interactive guide formations are defined by the tray and the disc holders.

YET STILL ANOTHER EXAMPLE, U.S. Pat. No. 5,331, 756 to Rehrig teaches walls of shopping cart baskets, advertising panels which include a plate element and a frame element which fits on the plate element and is releasibly held in place thereon by a tab-and-slot arrangement. When held in place, a slot and a card display area which is encircled by the frame element are formed between the plate and frame elements. An advertisement display card can then be easily slid into and out of the display area through this slot. Projections on at least one of the elements keep the card from falling out of place when in the area. Retrofitted and molded-in panel versions are disclosed. Plate elements of the retrofitted version can be secured together on the inside and outside of the basket wall providing inwardly and outwardly disposed display areas. The molded-in panel has its plate element molded with anti-recesses in from the outer surface of a wall of the plastic cart basket, and thus when positioned centrally on a basket side wall with the frame element held thereon, the panel does not prevent the carts from nesting. The frame element of the molded-in version, however, is preferably identical to that of the retrofitted version and is also releasibly retained in position using tabs and slots. The frame anti-plate elements are both symmetrical about their longitudinal axes.

STILL YET ANOTHER EXAMPLE, U.S. Pat. No. 5,442, 873 to Vogler teaches a unitary injection-molded plastic holder frame for displaying an advertising placard or the like. The frame has four frame sides connected at their ends into a rectangle, a contiguous trio of the sides having generally coplanar mutually directed shallow channels therein for receiving the side margins along three sides of the placard with the remaining frame side being slotted along its length to separate that side into two parallel frame strip. The slot is in coplanar relation to the shallow channels and communicates at its ends with the corresponding ends of the channels in two opposite frame sidles whereby the placard can be inserted via the slot into the frame with the margins of its three sides protruding into the channels. Detent means is provided for positively retaining the placard in its inserted position within the frame, in the form of at least one nib carried on an inner face of at least one of the frame strips projecting toward the opposite strip substantially into contact with the inner face of the opposite strip face and preventing the accidental passage of the placard through the slot. Preferably, each nib has an inclined edge extending from a point adjacent the inner side of the frame strip to a point adjacent its outer side and sloping in the direction from the inner to the outer side toward the opposite frame strip. The inclined edge facilitates the intentional passage of the placard past the nibs for removal from the frame.

It is apparent that numerous innovations for storage rack components have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

ACCORDINGLY, AN OBJECT of the present invention is to provide a display frame/interlocking storage component that avoids the disadvantages of the prior art.

ANOTHER OBJECT of the present invention is to provide a display frame/interlocking storage component that is simple and inexpensive to manufacture.

STILL ANOTHER OBJECT of the present invention is to provide a display frame/interlocking storage component that is simple to use.

BRIEFLY STATED, YET ANOTHER OBJECT of the present invention is to provide a display frame/interlocking storage rack component adaptable to receive and display a CD box and being stackable. The component includes a top with a throughopening for viewing a decorative top of the CD box. A back wall extends downwardly from the top. A pair of side walls extend downwardly from the top and form with the top an open front for insertion and removal of the CD box and for viewing a decorative front of the CD box. A back guide rail extends downwardly from the throughopening in the top and terminates below the back wall in a back guide rail supporting platform that supports the CD box. The top further includes a back notch for receiving the back guide rail supporting platform of a next stacked display frame/interlocking storage rack component. A pair of side guide rails extend downwardly from the throughopening in the top and terminate below the pair of side walls in a pair of side guide rail supporting platforms that further support the CD box. The top further includes two pair of side notches that open continuously into both the throughopening in the top and the pair of guide rails. The two pair of side notches are disposed in vertical alignment with the pairs of side guide rail supporting platforms. The two pair of side notches receive the pairs of side guide rail supporting platforms of the next stacked display frame/interlocking storage rack component. A pair of overhangs extend inwardly into the throughopening in the top and fill in the space between the side guide rail supporting platforms of the next stacked display frame/interlocking storage rack component and further support the CD box positioned in the next stacked display frame/interlocking storage rack component.

The novel features which are considered characteristic of the present invention are set forth in the appended claims. The invention itself, however, both as to its construction and method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of a plurality of stacked units of the present invention;

FIG. 2 is an enlarged diagrammatic perspective view of a single unit of the preferred embodiment of the present invention;

FIG. 3 is an enlarged diagrammatic front elevational view taken generally in the direction of arrow 3 in FIG. 2;

FIG. 4 is an enlarged diagrammatic bottom plan view taken generally in the direction of arrow 3 in FIGS. 2 and 3;

FIG. 5 is a cross sectional view taken on line 5—5 in FIG. 2 illustrating the top overhang;

FIG. 6 is a cross sectional view taken on line 6—6 in FIG. 2 illustrating a notch and a supporting platform;

FIG. 7 is an enlarged cross sectional view taken on line 7—7 in FIG. 1 illustrating the interfitting of a pair of vertically adjacent units of the present invention;

FIG. 8 is a diagrammatic perspective view of a CD being inserted into a unit of the present invention;

FIG. 9 is a diagrammatic bottom plan view of an alternate embodiment of a single unit of the present invention;

FIG. 10 is an enlarged diagrammatic fragmented view taken generally along line 10—10 in FIG. 9;

FIG. 11 is an enlarged diagrammatic fragmented view taken generally along line 11—11 in FIG. 9;

FIG. 12 is a diagrammatic front elevational view taken generally along line 12—12 in FIG. 9 illustrating the insertion of the replaceably mounted front panel;

FIG. 13 is a diagrammatic perspective view of the easel stand;

FIG. 14 is a diagrammatic side elevational view illustrating the easel stand being used to hang the present invention on a wall;

FIG. 15 is an enlarged cross sectional view of the area generally enclosed by the dotted circle identified by arrow 15 in FIG. 14 illustrating the interaction of the easel stand and the present invention;

FIG. 16 is a diagrammatic perspective view taken generally in the direction of arrow 16 in FIG. 14 illustrating a plurality of units of the present invention hung from a wall to form a display;

FIG. 17 is a diagrammatic side elevational view illustrating the easel stand supporting a unit of the present invention in landscape mode on a flat surface; and FIG. 18 is a diagrammatic side elevational view illustrating the easel stand supporting a unit of the present invention in portrait mode on a flat surface.

LIST OF REFERENCE NUMERALS UTILIZED IN THE DRAWING

Preferred Embodiment 10 display frame/interlocking storage rack component of the present invention
12 flat and rectangular-shaped top
14 top back
16 top front
18 top pair of parallel longitudinal sides
20 top rectangular-shaped throughopening
22 top throughopening back
24 top throughopening front
26 top throughopening pair of longitudinal sides
28 short, elongated, slender, flat, and rectangular-shaped back wall
30 pair of long, elongated, slender, parallel, flat, and rectangular-shaped side walls
31 rectangular-shaped open front
32 short, elongated, slender, flat, and rectangular-shaped back guide rail
34 back guide rail long, forwardly-perpendicularly-extending and rectangular-parallelepiped-shaped back guide rail supporting platform
36 top throughopening back elongated, slender, and rectangular-parallelepiped-shaped back notch
38 pair of long, elongated, slender, flat, and rectangular-shaped side guide rails
40 side guard rail pair of short, spaced-apart, inwardly-perpendicularly-extending, and rectangular-parallelepiped-shaped side guide rail supporting platforms
42 top throughopening side two pair of short, spaced-apart, and rectangular-parallelepiped-shaped side notches
44 top pair of flat and rectangular-shaped overhangs

Alternate Embodiment 110 display frame/interlocking storage rack component of the present invention
138 pair of long, elongated, slender, flat, and rectangular-shaped side guide rails
152 side guide rail pair of laterally aligned slots
154 pair of side wall channels
156 pair of back wall T-shaped tracks
158 elongated, slender, and generally rectangular-parallelepiped-shaped front wall
160 L-shaped easel stand
162 easel stand long leg
164 easel stand short leg
166 wall
168 any known mounting mechanism
170 horizontal surface

DETAILED DESCRIPTION OF THE PREFERRED EMBODIMENT

Referring now to the figures in which like numerals indicate like parts, and particularly to FIG. 1, which is a diagrammatic perspective view of a plurality of stacked units of the present invention, the display frame/interlocking storage rack component of the present invention is shown generally at 10 interlocked and vertically stacked with at least one other display frame/interlocking storage rack component 10.

The configuration of the display frame/interlocking storage rack component 10 can best be seen in FIGS. 2–6, which are an enlarged diagrammatic perspective view of a single unit of the preferred embodiment of the present invention, an enlarged diagrammatic front elevational view taken generally in the direction of arrow 3 in FIG. 2, an enlarged diagrammatic bottom plan view taken generally in the direction of arrow 3 in FIGS. 2 and 3, a cross sectional view taken on line 5—5 in FIG. 2 illustrating the top overhang, and a cross sectional view taken on line 6—6 in FIG. 2 illustrating a notch and a supporting platform, respectively, and as such will be discussed with reference thereto.

The display frame/interlocking storage rack component 10 is an integrally formed unit manufactured form thermal plastic in an injection molding process.

The display frame/interlocking storage rack component 10 includes a flat and rectangular-shaped top 12 with a top back 14, a top front 16 that is parallel to, and disposed in front of, the top back 14 of the flat and rectangular-shaped top 12, a top pair of parallel longitudinal sides 18 that extend perpendicularly forwardly from the top back 14 of the flat and rectangular-shaped top 12 to the top front 16 of the flat and rectangular-shaped top 12, and a top rectangular-shaped throughopening 20 that extends vertically and concentrically therethrough.

The top rectangular-shaped throughopening 20 in the flat and rectangular-shaped top 12 is defined by a top throughopening back 22 that is parallel to the top back 14 of the flat and rectangular-shaped top 12, a top throughopening front 24 that is parallel to the top front 16 of the flat and rectangular-shaped top 12, and a top throughopening pair of longitudinal sides 26 that are parallel to the top pair of parallel longitudinal sides 18 of the flat and rectangular-shaped top 12 and which extend perpendicularly forwardly from the top throughopening back 22 of the top rectangular-shaped throughopening 20 in the flat and rectangular-shaped top 12 to the top throughopening front 24 of the top rectangular-shaped throughopening 20 in the flat and rectangular-shaped top 12.

The display frame/interlocking storage rack component 10) further includes a short, elongated, slender, flat, and rectangular-shaped back wall 28 that has a height and extends perpendicularly downwardly from the top back 14 of the flat and rectangular-shaped top 12, along its entire length.

The display frame/interlocking storage rack component 10 further includes a pair of long, elongated, slender, parallel, flat, and rectangular-shaped side walls 30.

Each side wall of the pair of long, elongated, slender, parallel, flat, and rectangular-shaped side walls 30 extends perpendicularly downwardly from a respective longitudinal side of the top pair of parallel longitudinal sides 18 of the flat and rectangular-shaped top 12, along its entire length, and is joined perpendicularly at one end thereof to the short, elongated, slender, flat, and rectangular-shaped back wall 28, and forms at a terminal end thereof together with the top front 16 of the flat and rectangular-shaped top 12 a rectangular-shaped open front 31 for insertion of a CD.

Each side wall of the pair of long, elongated, slender, parallel, flat, and rectangular-shaped side walls 30 has a height that is equal to the height of, and is longer than, the short, elongated, slender, flat, and rectangular-shaped back wall 28.

The display frame/interlocking storage rack component 10 further includes a short, elongated, slender, flat, and rectangular-shaped back guide rail 32 that extends perpendicularly downwardly from the top throughopening back 22 of the top rectangular-shaped throughopening 20 in the flat and rectangular-shaped top 12, along its entire length, and which terminates below the short, elongated, slender, flat, and rectangular-shaped back wall 28 in a back guide rail long, forwardly-perpendicularly-extending and rectangular-parallelepiped-shaped back guide rail supporting platform 34 that extends along its entire length.

The flat and rectangular-shaped top 12 further includes a top throughopening back elongated, slender, and rectangular-parallelepiped-shaped back notch 36 that opens continuously into both the top throughopening back 22 of the top rectangular-shaped throughopening 20 in the flat and rectangular-shaped top 12 and in the short, elongated, slender, flat, and rectangular-shaped back guide rail 32, and extends along their entire lengths.

The display frame/interlocking storage rack component 10 further includes a pair of long, elongated, slender, flat, and rectangular-shaped side guide rails 38.

Each side guide rail of the pair of long, elongated, slender, flat, and rectangular-shaped side guide rails 38 extends perpendicularly downwardly from a respective longitudinal side of the top throughopening pair of longitudinal sides 26 of the top rectangular-shaped throughopening 20 in the flat and rectangular-shaped top 12, and terminates in a side guard rail pair of short, spaced-apart, inwardly-perpendicularly-extending, and rectangular-parallelepiped-shaped side guide rail supporting platforms 40 that extend inwardly therefrom, and which are shorter than, and coplanar with, the back guide rail long, forwardly-perpendicularly-extending and rectangular-parallelepiped-shaped back guide rail supporting platform 34.

Each side guide rail of the pair of long, elongated, slender, flat, and rectangular-shaped side guide rails 38 further extends perpendicularly forwardly from the short, elongated, slender, flat, and rectangular-shaped back guide rail 32 to past the top throughopening front 24 of the top rectangular-shape throughopening 20 in the flat and rectangular-shaped top 12, and terminates short of the top front 16 of the flat and rectangular-shaped top 12 so as to provide a recess for grabbing a CD to be removed from the display frame/interlocking storage rack component 10.

The flat and rectangular-shaped top 12 further includes a top throughopening side two pair of short, spaced-apart, and rectangular-parallelepiped-shaped side notches 42.

Each pair of side notches of the top throughopening side tax) pair of short, spaced-apart, and rectangular-parallelepiped-shaped side notches 42 open continuously into both a respective longitudinal side of the top throughopening pair of longitudinal sides 26 of the top rectangular-shaped throughopening 20 in the flat and rectangular-shaped top 12 and in a respective side guide rail of the pair of long, elongated, slender, flat and rectangular-shaped side guide rails 38, and are disposed in vertical alignment with the side guard rail pair of short, spaced-apart, inwardly-perpendicularly-extending, and rectangular-parallelepiped-shaped side guide rail supporting platforms 40 of the respective side guide rail of the pair of long, elongated, slender, flat, and rectangular-shaped side guide rails 38.

The flat and rectangular-shaped top 12 further includes a top pair of flat and rectangular-shaped overhangs 44.

Each overhang of the top pair of flat and rectangular-shaped overhangs of the flat and rectangular-shaped top 12 extends from a respective longitudinal side of the top throughopening pair of longitudinal sides 26 of the top rectangular-shaped throughopening 20 in the flat and rectangular-shaped top 12, coplanarly into the top rectangular-shaped throughopening 20 in the flat and rectangular-shaped top 12, a distance equal to the side guard rail pair of short, spaced-apart, inwardly-perpendicularly-extending, and rectangular-parallelepiped-shaped side guide rail supporting platforms 40 of a respective side guide rail of the pair of flat and rectangular-shaped side guide rails 38, and is disposed between a respective pair of side notches of the top throughopening side two pair of spaced-apart, side notches 42.

The manner of stacking more than one display frame/interlocking storage rack component 10 can best be seen in FIG. 7, which is an enlarged cross sectional view taken on line 7—7 in FIG. 1 illustrating the interfitting of a pair of vertically adjacent units of the present invention, and as such will be discussed with reference thereto.

STEP 1: Position a first display frame/interlocking storage rack component 10 where desired.

STEP 2: Position a second display frame/interlocking storage rack component 10 atop the first display frame/interlocking storage rack component 10.

STEP 3 Insert the back guide rail long, forwardly-perpendicularly-extending and rectangular-parallelepiped-shaped back guide rail supporting platform 34 of the short, elongated, slender, flat, and rectangular-shaped back guide rail 32 of the second display frame/interlocking storage rack component 10 into the top throughopening back elongated, slender, and rectangular-parallelepiped-shaped back notch 36 in the flat and rectangular-shaped top 12 of the first display frame/interlocking storage rack component 10.

STEP 4: Insert the side guard rail pair of short, spaced-apart, inwardly-perpendicularly-extending, and rectangular-parallelepiped-shaped side guide rail supporting platforms 40 of a side guide rail of the pair of long, elongated, slender, flat, and rectangular-shaped side guide rails 38 of the second display frame/interlocking storage rack component 10 into a respective pair of side notches of the top throughopening side two pair of short, spaced-apart, and rectangular-parallelepiped-shaped side notches 42 in the flat and rectangular-shaped top 12 of the first display frame/interlocking storage rack component 10, with an overhang of the top pair of flat and rectangular-shaped overhangs 44 of the flat and rectangular-shaped top 12 of the first display frame/interlocking storage rack component 10 extending coplanarly between the side guard rail pair of short, spaced-apart, inwardly-perpendicularly-extending, and rectangular-parallelepiped-shaped side guide rail supporting platforms 40 of the respective side guide rail of the pair of long, elongated, slender, flat, and rectangular-shaped side guide rails 38 of the second display frame/interlocking storage rack component 10.

The manner of loading a CD into the display frame/interlocking storage rack component 10 can best be seen in FIG. 8, which is a diagrammatic perspective view of a CD being inserted into a unit of the present invention, and as such will be discussed with reference thereto.

It is to be understood, however, that for the matter of simplicity the discussion will make reference to the use of a CD box, but it is to be understood that it's use is not limited to that since the display frame/interlocking storage rack component 10 can be manufactured in a wide range of sizes and can therefore accommodate boxes for other objects, such as, video tape cassettes, audio tape cassettes, and the like.

STEP 1: Position a typical CD box 46 at the rectangular-shaped open front 31.

STEP 2: Insert the typical CD box 46 past the rectangular-shaped open front 32.

STEP 3: Slide the typical CD box 46 onto the side guard rail pair of short, spaced-apart, inwardly-perpendicularly-extending, and rectangular-parallelepiped-shaped side guide rail supporting platforms 40 of each side guide rail of the pair of long, elongated, slender, flat, and rectangular-shaped side guide rails 38 until it reaches the short, elongated, slender, flat, and rectangular-shaped back guide rail 32 which terminates its longitudinal movement while the pair of long, elongated, slender, flat, and rectangular-shaped side guide rails 38 restrict lateral movement, and when in this position allows a CD box decorated top 48 of the typical CD box 46 to be visible through the top rectangular-shaped throughopening 20 in the flat and rectangular-shaped top 12 and a CD box decorated front. 50 of the typical CD 46 to be visible through the rectangular-shaped open front 31.

The configuration of an alternate embodiment of the display frame/interlocking storage rack component 110 can best be seen in FIGS. 9–13, which are a diagrammatic bottom plan view of an alternate embodiment of a single unit of the present invention, an enlarged diagrammatic fragmented view taken generally along line 10—10 in FIG. 9, an enlarged diagrammatic fragmented view taken generally along line 11—11 in FIG. 9, a diagrammatic front elevational view taken generally along line 12—12 in FIG. 9 illustrating the insertion of the replaceably mounted front panel, and a diagrammatic perspective view of the easel stand, respectively, and as such will be discussed with reference thereto.

The alternate embodiment of the display frame/interlocking storage rack component 110 is similar to the preferred embodiment of the display frame/interlocking storage rack component 10, except for the following:

1) The pair of long, elongated, slender, flat, and rectangular-shaped side guide rails 38 are replaced by a pair of long, elongated, slender, flat, and rectangular-shaped side guide rails 138 that extend perpendicularly forwardly from the short, elongated, slender, flat, and rectangular-shaped back wall 28 to past the top throughopening front 24 of the top rectangular-shaped throughopening 20 in the flat and rectangular-shaped top 12, and terminate short of the top front 16 of the flat and rectangular-shaped top 12.

2) The pair of long, elongated, slender, flat, and rectangular-shaped side guide rails 138 are laterally interrupted from forward of the top throughopening back 22 of the top rectangular-shaped throughopening 20 in the flat and rectangular-shaped top 12 to a rearmost pair of side guide. rail supporting platforms of the side guard rail pair of short, spaced-apart, inwardly-perpendicularly-extending, and rectangular-parallelepiped-shaped side guide rail supporting platforms 40 of the pair of long, elongated, slender, flat, and rectangular-shaped side guide rails 38 so as to form side guide rail pair of laterally aligned slots 152 therein.

3) A pair of side wall channels 154 extend perpendicularly from, and open inwardly of, each side wall of the pair of long, elongated, slender, parallel, flat, and rectangular-shaped side walls 30. A forwardmost side wall channel of the pair of side wall channels 154 of each side wall of the pair of long, elongated, slender, parallel, flat, and rectangular-shaped side walls 30 is disposed at the top front 16 of the flat and rectangular-shaped top 12. A rearwardmost side wall channel of the pair of side wall channels 154 of each side wall of the pair of long, elongated, slender, parallel, flat, and rectangular-shaped. side walls 30 is disposed in lateral alignment with a respective slot of the side guide rail pair of laterally aligned slots 152 in the pair of long, elongated, slender, flat, and rectangular-shaped side guide rails 138.

4) A pair of back wall T-shaped tracks 156 extend perpendicularly from, and open forwardly of, the short, elongated, slender, flat, and rectangular-shaped back wall 28, and are disposed between the pair of long, elongated, slender, flat, and rectangular-shaped side guide rails 138.

5) An elongated, slender, and generally rectangular-parallelepiped-shaped front wall 158 is replaceably mounted. in either the forwardmost side wall channel of the pair of side wall channels 154 of each side wall of the pair of long, elongated, slender, parallel, flat, and rectangular-shaped side walls 30 or the rearwardmost side wall channel of the pair of side wall channels 154 of each side wall of the pair of long, elongated, slender, parallel, flat, and rectangular-shaped side walls 30 where it passes freely through the side guide rail pair of laterally aligned slots 152 in the pair of long, elongated, slender, flat, and rectangular-shaped side guide rails 138. When the elongated, slender, and generally rectangular-parallelepiped-shaped front wall 158 is replaceably mounted in the forwardmost side wall channel of the pair of side wall channels 154 of each side wall of the pair of long, elongated, slender, parallel, flat, and rectangular-shaped side walls 30 the rectangular-shaped open front 31 is closed and a box (not shown) is replaceably maintained in the display frame/interlocking storage rack component 110 for display. And, when the elongated, slender, and generally rectangular-parallelepiped-shaped front wall 158 is replaceably mounted in the rearwardmost side wall channel of the pair of side wall channels 154 of each side wall of the pair of long, elongated, slender, parallel, flat, and rectangular-shaped side walls 30 the display frame/interlocking storage rack component 110 is used as a rack component.

6) An L-shaped easel stand 160 having an easel stand long leg 162 and a easel stand short leg 164 which extends perpendicularly from the easel stand long leg 162 of the L-shaped easel stand 160 is replaceably mounted in either channel of the pair of side wall channels 154 or in either track of the pair of back wall T-shaped tracks 156.

The manner of hanging the display frame/interlocking storage rack component 110 for display can best be seen in FIGS. 14–16, which are a diagrammatic side elevational view illustrating the easel stand being used to hang the present invention on a wall, an enlarged cross sectional view of the area generally enclosed by the dotted circle identified by arrow 15 in FIG. 14 illustrating the interaction of the easel stand and the present invention, and a diagrammatic perspective view taken generally in the direction of arrow 16 in FIG. 14 illustrating a plurality of units of the present invention hung from a wall to form a display, respectively, and as such will be discussed with reference thereto.

STEP 1: Insert fully the easel stand short leg 164 of the L-shaped easel stand 160 in either track of the pair of back wall T-shaped tracks 156.

STEP 2: Affix the easel stand long leg 162 of the L-shaped easel stand 160 to a wall 166 by any known mounting mechanism 168, such as hook and loop fasteners, two sided tape, or the like.

Another manner of displaying the display frame/interlocking storage rack component 110 can best be seen in FIGS. 17 and 18, which are a diagrammatic side elevational view illustrating the easel stand supporting a unit of the present invention in landscape mode on a flat surface, and a diagrammatic side elevational view illustrating the easel stand supporting a unit of the present invention in portrait mode on a flat surface, respectively, and as such will be discussed with reference thereto.

STEP 1: Insert the easel stand long leg 162 of the L-shaped easel stand 160 in either track of the pair of back wall T-shaped tracks 156 when the display frame/interlocking storage rack component 110 is to be displayed on a horizontal surface 170 in a landscape mode or insert the easel stand long leg 162 of the L-shaped easel stand 160 in any channel of the pair of side wall channels 154 when the display frame/interlocking storage rack component 110 is to be displayed on the horizontal surface 170 in a portrait mode.

It will be understood that each of the elements described above, two or more together, may also find a useful application in other typed of constructions differing from the typed described above.

While the invention has been illustrated and described as embodied in display frame/interlocking storage rack component, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

What is claimed as new and desired to be protected by Letters Patent is set forth in the appended claims:

1. A display frame/interlocking storage rack component adaptable to receive and display a box and being stackable, comprising:

a) a top with a back, a front disposed in front of said back of said top, a pair of longitudinal sides extending forwardly from said back of said top to said front of said top, and a throughopening extending vertically and concentrically therethrough for viewing a decorative top of the box when the box is positioned in said display frame/interlocking storage rack component; said throughopening in said top being defined by a back, a front, and a pair of longitudinal sides extending forwardly from said back of said throughopening in said top to said front of said throughopening in said top;

b) a back wall having a height and extending downwardly from said back of said top;

c) a pair of side walls, each of which extending downwardly from a respective longitudinal side of said pair of longitudinal sides of said top along its entire length, and being joined at one end thereof to said back wall, and forming at a terminal end thereof together with said front of said top an open front for insertion and removal of the box from said display frame/interlocking storage rack component and for viewing a decorative front of the box positioned in said display frame/interlocking storage rack component;

d) a pair of side guide rails, each of which extending downwardly from a respective longitudinal side of said pair of longitudinal sides of said throughopening in said top; each side guide rail of said pair of said guide rails terminating below said pair of side walls in a pair of side guide rail supporting platforms extending inwardly therefrom and supporting the box positioned in said display frame/interlocking storage rack component; said top further including two pair of side notches, each pair of which opening continuously into both a respective longitudinal side of said pair of longitudinal sides of said throughopening in said top and in a respective side guide rail of said pair of guide rails; each pair of side notches of said two pair of side notches being disposed in vertical alignment with said pair of side guide rail supporting platforms of said respective side guide rail of said pair of side guide rails; each pair of side notches of said two pair of side notches receiving said pair of side guide rail supporting platforms of a respective side guide rail of said pair of side guide rails of a next stacked display frame/interlocking storage rack component; and e) a pair of overhangs, each of which extending inwardly from a respective longitudinal side of said pair of longitudinal sides of said throughopening in said top, and being disposed between a respective pair of side notches of said two pair of side notches; each overhang of said pair of overhangs filling in space between, and being coplanar with, said side guide rail supporting platforms of said respective side guide rail of said pair of side guide rails of said next stacked display, frame/interlocking storage rack component, and further supporting the box positioned in said next stacked said display frame/interlocking storage rack component.

2. The component as defined in claim 1, wherein said top, said back wall, said pair of side walls, and said pair of side guide rails are integrally formed from thermal plastic by injection molding.

3. The component as defined in claim 1, wherein said top is a flat and rectangular-shaped top; said front of said flat and rectangular-shaped top is parallel to said back of said flat and rectangular-shaped top; said pair of longitudinal sides of said flat and rectangular-shaped top are a pair of parallel longitudinal sides, and said throughopening in said flat and rectangular-shaped top is a rectangular-shaped throughopening.

4. The component as defined in claim 1, wherein said back of said throughopening in said top is parallel to said back of said top; said front of said throughopening in said top is parallel to said front of said top; said pair of longitudinal sides of said throughopening in said top are parallel to said pair of longitudinal sides of said top and extend perpendicularly forwardly from said back of said throughopening in said top to said front of said throughopening in said top.

5. The component as defined in claim 1, wherein said back wall is a short, elongated, slender, flat, and rectangular-shaped back wall, and extends perpendicularly downwardly from said back of said top, along its entire length.

6. The component as defined in claim 1, wherein said pair of said walls are a pair of long, elongated, slender, parallel, flat, and rectangular-shaped side walls; each side wall of said pair of long, elongated, slender, parallel, flat, and rectangular-shaped side walls extends perpendicularly downwardly from said respective longitudinal side of said pair of longitudinal sides of said top, and is joined perpendicularly at said one end thereof to said back wall; said open front is a rectangular-shaped open front.

7. The component as defined in claim 1, wherein each side wall of said pair of side walls has a height that is equal to said height of, and is longer than, said back wall.

8. The component as defined in claim 1, wherein said pair of side guide rails is a pair of long, elongated, slender, flat, and rectangular-shaped side guide rails; each side guide rail of said pair of long, elongated, slender, flat, and rectangular-shaped side guide rails extends perpendicularly downwardly from said respective longitudinal side of said pair of longitudinal sides of said throughopening in said top; said pair of side guide rail supporting platforms are a pair of short, spaced-apart, inwardly-perpendicularly-extending, and rectangular-parallelepiped-shaped side guide rail supporting platforms.

9. The component as defined in claim 1, wherein said two pair of side notches are two pair of short, spaced-apart, and rectangular-parallelepiped-shaped side notches.

10. The component as defined in claim 1, wherein said pair of overhangs are a pair of flat and rectangular-shaped overhangs, each of which extends from said respective longitudinal side of said pair of longitudinal sides of said throughopening in said top, coplanarly into said throughopening in said top, a distance equal to said pair of side guide rail supporting platforms of a respective side guide rail of said pair of side guide rails.

11. The component as defined in claim 1; further comprising a back guide rail extending downwardly from said back of said throughopening in said top along its entire length; said back guide rail terminating below said back wall in a back guide rail supporting platform extending forwardly along its entire length and further supporting the box positioned in said display frame/interlocking storage rack component; said top further including a back notch opening continuously into both said back of said throughopening in said top and in said back guide rail, and extending along their entire lengths; said back notch receiving said back guide rail supporting platform of said next stacked display frame/interlocking storage rack component when said display frame/interlocking storage rack components are stacked.

12. The component as defined in claim 11, wherein said back notch is an elongated, slender, and rectangular-parallelepiped-shaped back notch.

13. The component as defined in claim 11, wherein said top, said back wall, said pair of side walls, said pair of side guide rails, and said back guide rail are integrally formed from thermal plastic by injection molding.

14. The component as defined in claim 11, wherein said back guide rail is a short, elongated, slender, flat, and rectangular-shaped back guide rail that extends perpendicularly downwardly from said back of said throughopening in said top; said back guide rail supporting platform is a long, forwardly-perpendicularly-extending and rectangular-parallelepiped-shaped back guide rail supporting platform.

15. The component as defined in claim 11, wherein each side guide rail of said pair of side guide rails further extends perpendicularly forwardly from said back guide rail to past said front of said throughopening in said top, and terminates short of said front of said top so as to provide a recess for grabbing the box to be removed from said display frame/interlocking storage rack component.

16. The component as defined in claim 1, wherein said pair of side guide rails are laterally interrupted from forward of said back of said throughopening in said top to a rearmost pair of said side guide rail supporting platforms of said pair of side guide rails so as to form a pair of laterally aligned slots therein.

17. The component as defined in claim 16; further comprising a pair of channels extending perpendicularly from, and opening inwardly of, each side wall of said pair of side walls; a forwardmost channel of said pair of channels of each side wall of said pair of side walls being disposed at said front of said top; a rearwardmost channel of said pair of channels of each side wall of said pair of side walls being disposed in lateral alignment with said pair of laterally aligned slots in said pair of side guide rails.

18. The component as defined in claim 17; further comprising a pair of back wall T-shaped tracks extending perpendicularly from, and open forwardly of, said back wall, and being disposed between said pair of side guide rails.

19. The component as defined in claim 17; further comprising an elongated, slender, and generally rectangular-parallelepiped-shaped front wall replaceably mounted in one of a forwardmost channel of said pair of channels of each side wall of said pair of side walls and a rearwardmost channel of said pair of channels of each side wall of said pair of side walls where it passes freely through said pair of laterally aligned slots in said pair of side guide rails.

20. The component as defined in claim 18; further comprising an L-shaped easel stand having a long leg and a short leg extending perpendicularly from said long leg of said L-shaped easel stand; said short leg of said L-shaped easel stand being replaceably mounted in a track of said pair of T-shaped tracks with said long leg of said L-shaped easel extending downwardly therefrom and contacting, and being affixed to, a wall when said display frame/interlocking storage rack component is hung from the wall for display; said long leg of said L-shaped easel stand being replaceably mounted in a track of said pair of T-shaped tracks with said short leg of said L-shaped easel stand contacting a horizontal surface when said display frame/interlocking storage rack component is displayed on the horizontal surface in a landscape mode; said long leg of said L-shaped easel stand being replaceably mounted in a channel of said pair of channels of a side wall of said pair of said walls with said short leg of said L-shaped easel stand contacting the horizontal surface when said display frame/interlocking storage rack component is displayed on the horizontal surface in a portrait mode.

21. A method of storing and displaying a box, comprising the step of storing and displaying the box in a display frame/interlocking storage rack component which comprises:

a) a top with a back, a front disposed in front of said back of said top, a pair of longitudinal sides extending forwardly from said back of said top to said front of said top, and a throughopening extending vertically and concentrically therethrough for viewing a decorative top of the box when the box is positioned in said display frame/interlocking storage rack component; said throughopening in said top being defined by a back, a front, and a pair of longitudinal sides extending forwardly from said back of said throughopening in said top to said front of said throughopening in said top;

b) a back wall having a height and extending downwardly from said back of said top;

c) a pair of side walls, each of which extending downwardly from a respective longitudinal side of said pair of longitudinal sides of said top along its entire length, and being joined at one end thereof to said back wall, and forming at a terminal end thereof together with said front of said top an open front for insertion and removal of the box from said display frame/interlocking storage rack component and for viewing a decorative front of the box positioned in said display frame/interlocking storage rack component;

d) a pair of side guide rails, each of which extending downwardly from a respective longitudinal side of said pair of longitudinal sides of said throughopening in said top; each side guide rail of said pair of said guide rails terminating below said pair of side walls in a pair of side guide rail supporting platforms extending inwardly therefrom and supporting the box positioned in said display frame/interlocking storage rack component; said top further including two pair of side notches, each pair of which opening continuously into both a respective longitudinal side of said pair of longitudinal sides of said throughopening in said top and in a respective side guide rail of said pair of guide rails; each pair of side notches of said two pair of side notches being disposed in vertical alignment with said pair of side guide rail supporting platforms of said respective side guide rail of said pair of side guide rails; each pair of side notches of said two pair of side notches receiving said pair of side guide rail supporting platforms of a respective side guide rail of said pair of side guide rails of a next stacked display frame/interlocking storage rack component; and e) a pair of overhangs, each of which extending inwardly from a respective longitudinal side of said pair of longitudinal sides of said throughopening in said top, and being disposed between a respective pair of side notches of said two pair of side notches; each overhang of said pair of overhangs filling in space between, and being coplanar with, said side guide rail supporting platforms of said respective side guide rail of said pair of side guide rails of said next stacked display frame/interlocking storage rack component, and further supporting the box positioned in said next stacked said display frame/interlocking storage rack component.

* * * * *